C. F. FREDE.
ELECTRIC MOTOR TRUCK.
APPLICATION FILED SEPT. 15, 1911.

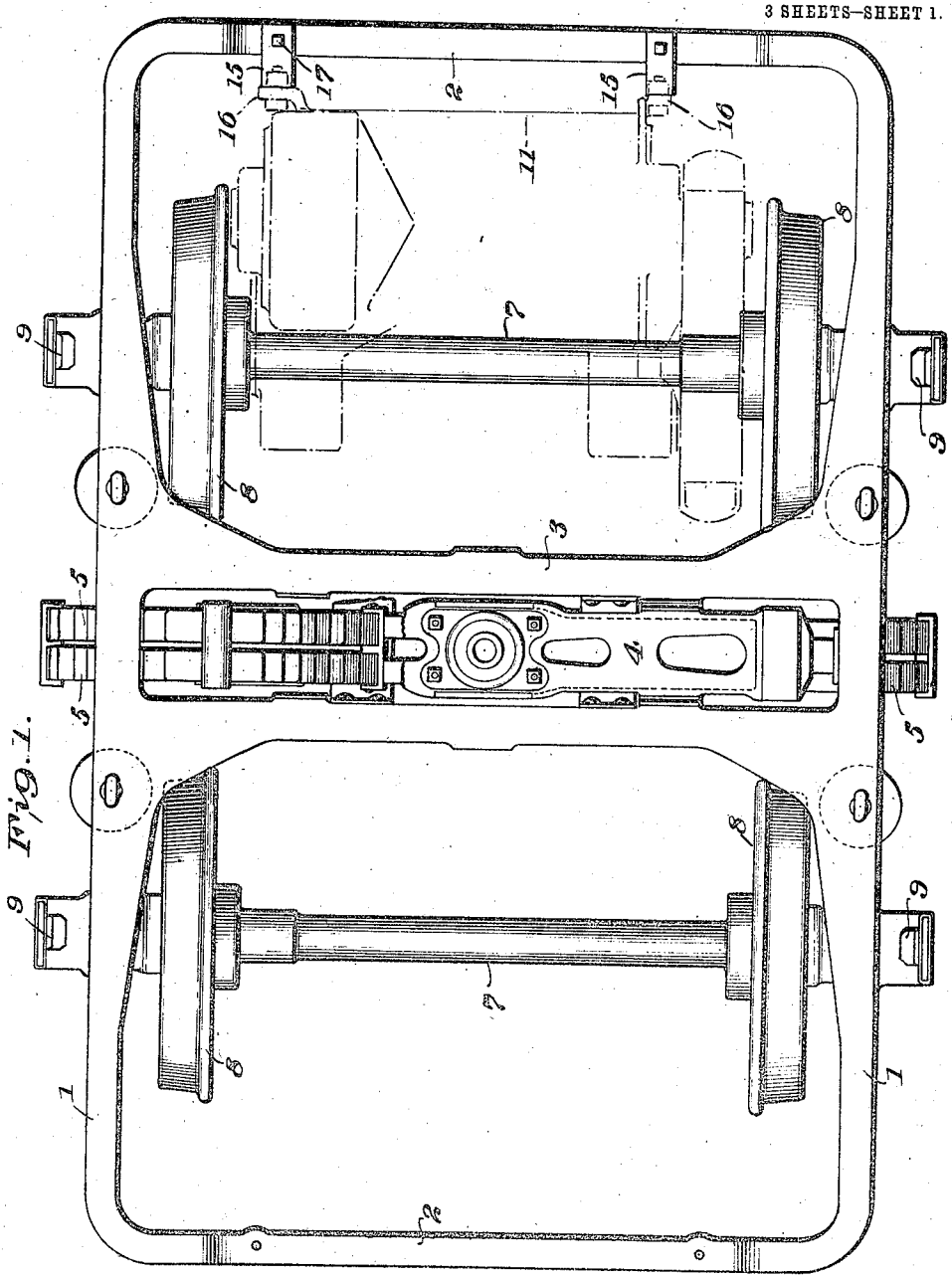

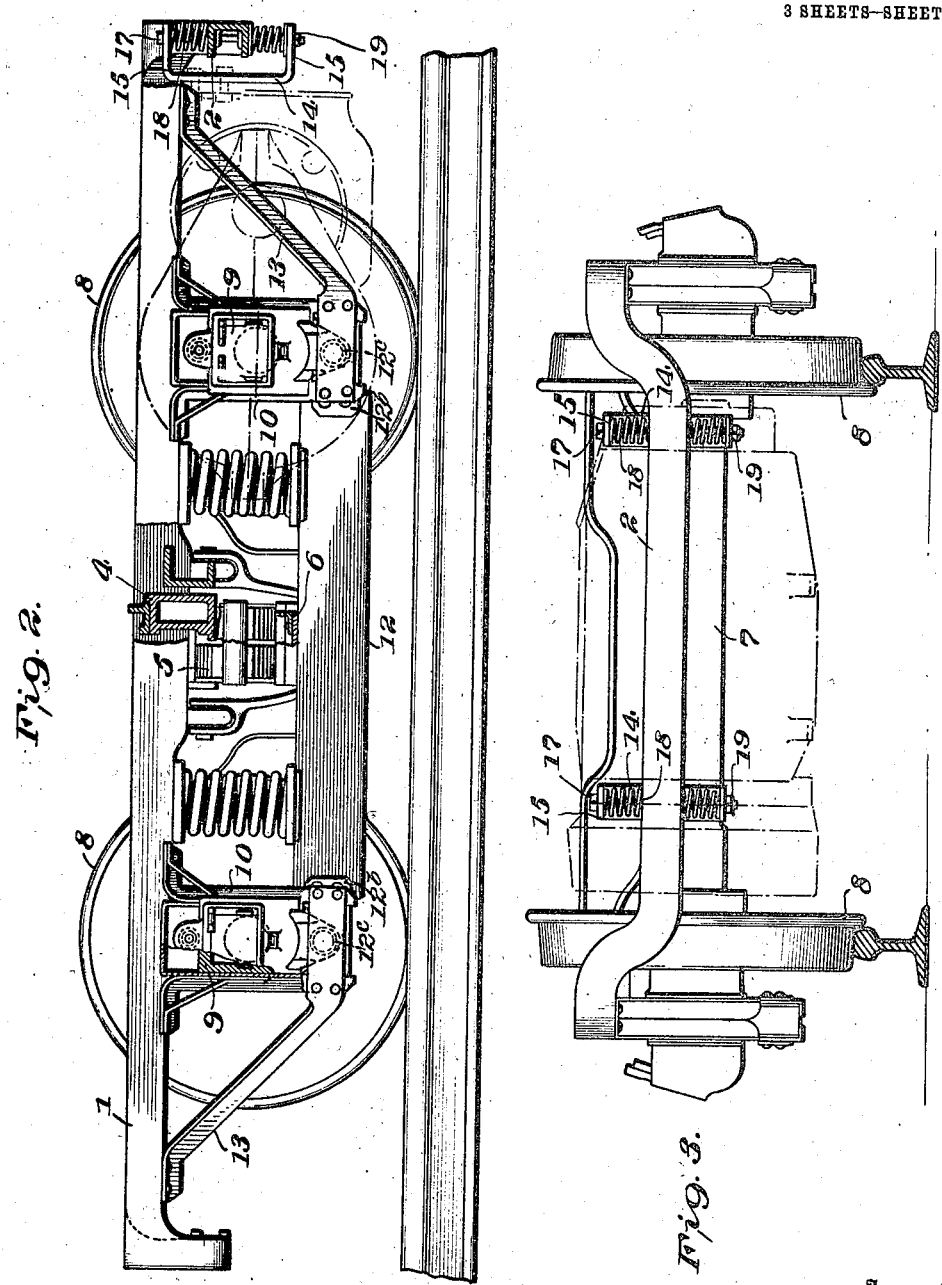

1,061,281.

Patented May 13, 1913.

3 SHEETS—SHEET 3.

Witnesses:
J. Adolph Bishop.
M. P. Smith.

Inventor:
Charles F. Frede,

UNITED STATES PATENT OFFICE.

CHARLES F. FREDE, OF ST. LOUIS, MISSOURI, ASSIGNOR TO DOUBLE BODY BOLSTER COMPANY, OF ST. LOUIS, MISSOURI, A CORPORATION OF NEW JERSEY.

ELECTRIC-MOTOR TRUCK.

1,061,281.  Specification of Letters Patent.  Patented May 13, 1913.

Application filed September 15, 1911. Serial No. 649,564.

*To all whom it may concern:*

Be it known that I, CHARLES F. FREDE, a citizen of the United States, residing at St. Louis, Missouri, have invented a certain new and useful Improvement in Electric-Motor Trucks, of which the following is a full, clear, and exact description, such as will enable others skilled in the art to which it appertains to make and use the same, reference being had to the accompanying drawings, forming part of this specification, in which—

Figure 4:
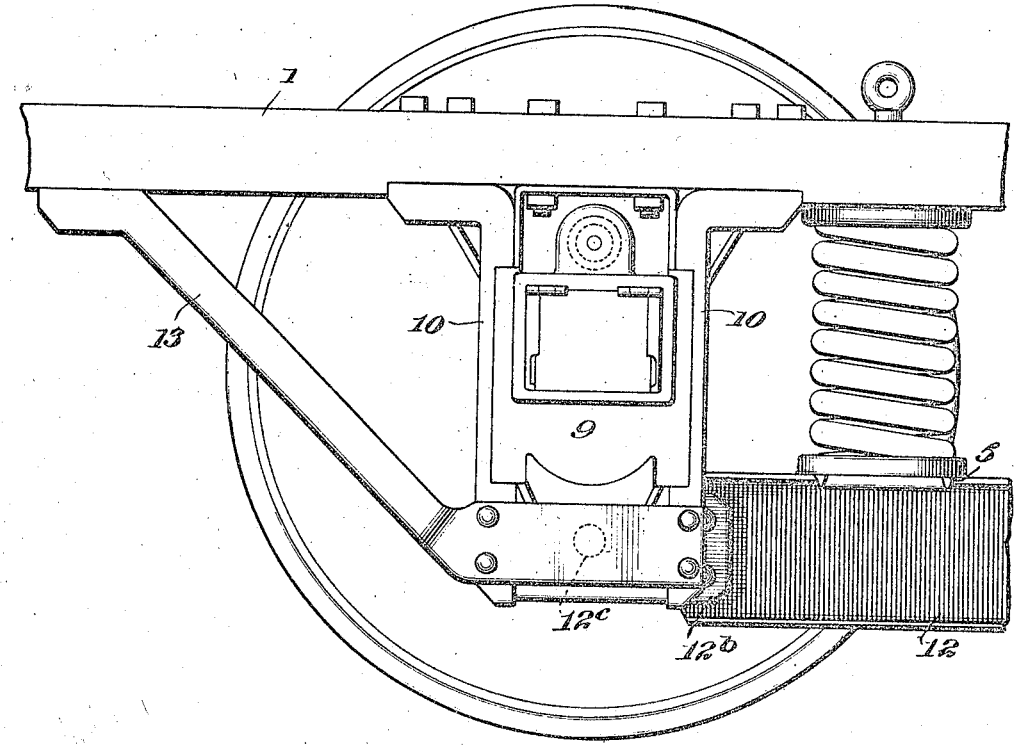
Figure 5:
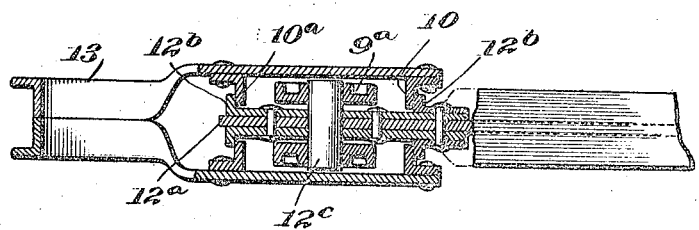

Figure 1 is a plan view of an electric motor truck of my improved construction. Fig. 2 is a side elevation of the truck, with parts thereof shown in vertical section. Fig. 3 is an end elevation of my improved truck. Fig. 4 is an enlarged elevational view of the end portion of a truck of my improved construction. Fig. 5 is a horizontal section taken on the line 5—5 of Fig. 4.

This invention relates generally to electric motor trucks, and more particularly to the construction and arrangement of the supports for the motor frame, and which supports are yieldingly mounted upon the truck frame.

My invention relates further to the side frames of the truck and to the means employed for bracing the lower portions of the pedestals that depend from the wheel pieces of the truck frame.

The objects of my invention are to provide simple, inexpensive means, whereby the outer portion of the frame or housing of the motor is yieldingly held and supported upon the truck frame against both upward and downward movement; and to arrange suitable braces between the ends of the wheel pieces and the lower ends of the pedestals, which braces in combination with an equalizer bar between the lower portions of the pedestals form practically a continuous bottom tie for the pedestals, thereby materially increasing the strength of the side frame of the truck.

To the above purposes my invention consists in certain novel features of construction and arrangement of parts hereinafter more fully described and claimed.

Referring by numerals to the accompanying drawings, 1 indicates the wheel pieces or side rails of the truck frame, 2 the end rails, 3 the transoms, 4 the truck bolster, which is supported in the usual manner upon elliptic springs 5, which latter are carried upon a spring plank 6.

7 designates the axles carrying the wheels 8, and the ends of said axles are arranged in suitable journal boxes 9 positioned between pedestals 10, which latter are rigidly fixed to and depend from the wheel pieces 1 of the truck frame.

11 designates the motor frame housing, which is arranged upon the axles 7 in the usual manner.

All of the parts just described are of the ordinary construction well known in the art. Ordinary equalizer bars 12 are arranged beneath the wheel pieces of the truck frame and between the inner members of the pairs of pedestals, and interposed between these equalizer bars and the wheel pieces of the truck frame are the usual compression springs.

In order to materially strengthen the side frames of the truck and particularly the lower portions thereof equalizer bars 12 are arranged beneath the wheel pieces of the truck frame and the end portions 12$^a$ of said bars extend through vertically disposed slots 10$^a$ formed in the lower portions of the pedestals 10. Fixed on these end portions 12$^a$ and bearing against the outer faces of the lower portions of the pedestals 10 to the sides of the vertical slots therein are brackets 12$^b$. The journal boxes 9 are provided with depending brackets 9$^a$ which straddle the end portions 12$^a$ of the bar between the pedestals, and passing through these brackets and seated in the end portions 12$^a$ are pins 12$^c$.

Diagonally disposed braces 13 are fixed at their upper ends to the wheel pieces 1, and the lower portions of said braces are divided and extend horizontally across the space between the pedestals, and these divided lower portions are fixed to the lower portions of the pedestals 10 on the outer faces thereof. Interposed between the bars 12 and the wheel pieces 1 adjacent to the inner pedestals are the usual compression springs.

The construction just described permits the wheel pieces to move vertically with respect to the journal boxes 9 and the equalizer bars 12, and during such vertical movement the end portions 12$^a$ of the equalizer bars move through the vertically disposed slots 10ª in the lower portions of the pedestals. The brackets 12ᵇ carried by the end portions of the equalizer bars prevent said bars from moving lengthwise or horizontally with respect to the pedestals.

The braces 13, in connection with the equalizer bar 12, form practically a continuous bottom tie for the pedestals and wheel pieces, and which continuous tie performs the function of a tension member, thus materially increasing the strength and rigidity of the side frames.

The brackets used for yieldingly supporting and connecting the motor frames with the end rails 2 each comprise a vertically disposed body portion 14, the ends of which are bent at right angles relative to the body portion, as designated by 15, and these end portions occupy positions immediately above and below the end rail 2. The body portions 14 of these brackets are detachably fixed in any suitable manner to lugs 16 formed integral with the side portions of the motor frame 11. Suitable apertures are formed in the end portions of the bent ends 15 of each bracket, and corresponding apertures are formed through the end rail 2.

Bolts 17 are inserted through the corresponding apertures in the ends 15, and rail 2, and compression springs 18 are located upon the bolts 17, and interposed between the rail 2 and the bent ends 15 of the bracket. A nut or key 19 is located upon the lower end of each bolt 17 for the purpose of holding the same in place. This construction forms a direct connection between the motor frame and the end rail of the truck and the motor frame is yieldingly held, with respect to the motor frame, by the springs 18 interposed between the rail 2 and the ends of the bracket 15.

The springs 18, between the ends of the bracket and the end rail, perform the function of shock absorbers for the motor frame, and thus the greater portion of the shocks and jars, which might be transmitted from the axles and motor frame to the truck frame and vice versa, are eliminated.

The bolts 17 are inserted from the top through the openings in the brackets and end rail 2 so that in case of the loss of the nut or key from the lower end of the bolt, the latter will retain its position, and, consequently, hold the parts in their working positions.

While I have shown and described the yielding support for the motor frame as applied to outside hung motors it will be readily understood that the same construction, namely a bracket and spring, can be advantageously employed on inside hung motors, and in the latter case the bracket and spring are connected to one of the inner cross members or transoms of the truck.

Thus it will be seen how I have constructed a truck having side frames of great strength and rigidity, and the motor frames of which truck are yieldingly connected to and supported by the truck frame.

It will be readily understood that minor changes in the construction and arrangement of parts can be made in my improved electric motor truck without departing from the spirit of my invention, the scope of which is set forth in the appended claims.

I claim,

1. In an electric motor truck, a truck frame having wheel pieces, pedestals depending therefrom, a vertically movable equalizer bar between the lower ends of the pedestals and diagonally disposed bars fixed at their upper ends to the wheel pieces and the lower ends of which braces are divided and fixed to the lower ends of the pedestals on the outer faces thereof.

2. In an electric motor truck, a truck side frame comprising a wheel piece, pairs of pedestals fixed to and depending therefrom, journal boxes between the pairs of pedestals, an equalizer bar connected to the journal boxes, and diagonally disposed brace members fixed to the end portions of the wheel piece at their upper ends, the lower ends of which brace members span the space between the pedestals below the journal boxes, and said brace members being fixed to said pedestals.

3. In an electric motor truck, a truck frame having wheel pieces, pedestals arranged in pairs, which pedestals are fixed to and depend from the wheel pieces, a vertically movable equalizer bar arranged between the lower ends of the pairs of pedestals and diagonally disposed braces fixed to the end portions of the wheel pieces at their upper ends, their lower ends being divided and fixed to the lower portions of the pedestals on the outer faces thereof, which equalizer bars and diagonally disposed braces form the lower chords of the side frames of the truck.

4. In an electric motor truck, the combination with a truck frame having wheel pieces, pedestals depending therefrom, and journal boxes between the pedestals, of a continuous lower chord for the truck side frame, which lower chord comprises a vertically movable equalizer bar connected to the journal boxes, and diagonally disposed brace members, extending downward from the end portions of the wheel pieces, the lower ends of which brace members are divided and are fixed to the inner and outer side faces of the pedestals below the journal boxes.

5. In an electric motor truck, a motor frame support comprising a bracket fixed to the motor frame, the ends of which bracket extend above and below a transverse member of the truck frame, and springs interposed between the projecting ends of said bracket and the transverse member of the truck frame.

6. In an electric motor truck, the combination with a motor frame and truck frame, of a bracket positioned on the motor frame, parts of which bracket occupy positions above and below a part of the truck frame, compression springs interposed between the ends of the bracket and the adjacent part of the truck frame and means passing through the bracket, compression springs and the corresponding portion of the truck frame for holding said springs in operative position.

7. In an electric motor truck, the combination with a transversely disposed part of the truck frame, of arms projecting from the motor frame above and below the transverse part of the truck frame, compression springs interposed between said arms and the transverse portion of the truck frame and a bolt passing through said arms, through the springs and through the transverse portion of the truck frame.

In testimony whereof I hereunto affix my signature in the presence of two witnesses this 6th day of September, 1911.

CHARLES F. FREDE.

Witnesses:
HAL C. BELLVILLE,
FRED W. DIECKMANN.